United States Patent
Yoon

(10) Patent No.: US 8,705,412 B2
(45) Date of Patent: Apr. 22, 2014

(54) APPARATUS AND METHOD FOR PROTECTING RECEIVE CIRCUITS IN TDD WIRELESS COMMUNICATION SYSTEM

(75) Inventor: Hyun-Su Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 439 days.

(21) Appl. No.: 12/840,491

(22) Filed: Jul. 21, 2010

(65) Prior Publication Data

US 2011/0026442 A1 Feb. 3, 2011

(30) Foreign Application Priority Data

Jul. 31, 2009 (KR) .................. 10-2009-0070660

(51) Int. Cl.
| H04B 7/005 | (2006.01) |
| H04B 1/56 | (2006.01) |
| H04B 1/50 | (2006.01) |
| H04B 17/00 | (2006.01) |

(52) U.S. Cl.
CPC .. H04B 1/56 (2013.01); H04B 1/50 (2013.01); H04B 17/0027 (2013.01)
USPC ............................................... 370/278

(58) Field of Classification Search
CPC ........ H04B 1/56; H04B 1/50; H04B 17/0027; H04B 17/0032; H04B 17/004
USPC ................ 370/278, 280; 455/78, 83
See application file for complete search history.

(56) References Cited

U.S. PATENT DOCUMENTS

| 2006/0087385 A1* | 4/2006 | Fitzpatrick et al. ........... 333/117 |
| 2007/0002781 A1* | 1/2007 | Yoon et al. ..................... 370/280 |
| 2007/0049225 A1* | 3/2007 | Yoon ............................. 455/217 |
| 2008/0102763 A1* | 5/2008 | Yoon ............................... 455/78 |
| 2010/0069011 A1* | 3/2010 | Carrick et al. ............... 455/63.1 |

* cited by examiner

*Primary Examiner* — Pao Sinkantarakorn
*Assistant Examiner* — Richard K Chang
(74) *Attorney, Agent, or Firm* — Jefferson IP Law, LLP

(57) ABSTRACT

An apparatus and a method for protecting receive circuits in a Time Division Duplexing (TDD) wireless communication system are provided. The receive circuit protecting apparatus includes a TDD controller for controlling transmission and reception modes according to transmission and reception intervals, a transmitter for power-amplifying and outputting a Radio Frequency (RF) signal in the transmission mode under control of the TDD controller, and a Transmit/Receive Antenna Switch (TRAS) for, in the transmission mode, forwarding a signal of the transmitter to an antenna feed line under the control of the TDD controller and for absorbing an output signal of the transmitter flowing to the receive circuits using a reflection structure positioned in a reception path, and, in the reception mode, for forwarding a signal fed from the antenna feed line to the receive circuits under the control of the TDD controller.

20 Claims, 5 Drawing Sheets

# APPARATUS AND METHOD FOR PROTECTING RECEIVE CIRCUITS IN TDD WIRELESS COMMUNICATION SYSTEM

PRIORITY

This application claims the benefit under 35 U.S.C. §119(a) of a Korean patent application filed in the Korean Intellectual Property Office on Jul. 31, 2009, and assigned Serial No. 10-2009-0070660, the entire disclosure of which is hereby incorporated by reference.

BACKGROUND OF THE INVENTION

1. Field of the Invention

The present invention relates to a Radio Frequency (RF) transceiver apparatus in a Time Division Duplexing (TDD) wireless communication system. More particularly, the present invention relates to an apparatus and a method for protecting a Low Noise Amplifier (LNA) of a receiving stage in the TDD wireless communication system.

2. Description of the Related Art

A Time Division Duplexing (TDD) wireless communication system realizes bidirectional communications by time-dividing the same frequency and splitting one frame into transmission and reception. Accordingly, the wireless communication system switches a high-power Radio Frequency (RF) transmit signal and a low-power RF receive signal using a Transmit/Receive Antenna Switch (TRAS).

The TRAS serves to protect a Low Noise Amplifier (LNA) by shutting down the transmit power supplied to a receiving end in a transmission mode, and to reduce noise in a transmitting end in a reception mode.

FIG. 1 depicts an RF transceiver apparatus in a TDD wireless communication system according to the related art.

Referring to FIG. 1, the RF transceiver apparatus includes a TDD controller 100, a transmitter 110, a TRAS 120, a front end block 130, and a receiver 140.

The TDD controller 100 issues TDD control signals to control each block according to transmission and reception modes. For example, the TDD controller 100 issues a TDD Control signal for Transceiver (TCT) control signal to control the transmitter 110. The TDD controller 100 issues a TDD Control signal for a TRAS (TCTR) control signal to control the TRAS 120. The TDD controller 100 issues a TDD Control signal for Receiver (TCR) control signal to control the receiver 140.

In a transmission mode, the transmitter 110 converts a baseband modulated signal input from a modem (not shown) into an RF signal under the control of the TDD controller 100. The transmitter 110 power-amplifies the RF signal using a power amplifier disposed in the back end. Next, the transmitter 110 outputs the amplified RF signal to the front end block 130 via the TRAS 120.

In the transmission mode, the TRAS 120 interconnects the transmitter 110 and the receiver 140 and isolates the transmission path from the receiver 140 under the control of the TDD controller 100.

In the reception mode, the TRAS 120 interconnects the front end part 130 and the receiver 140 and isolates the reception path from the transmitter 110 under the control of the TDD controller 100.

In the reception mode, the receiver 140 low noise amplifies the low-power RF receive signal fed from the front end block 130 via the TRAS 120 under the control of the TDD controller 100.

The front end block 130 includes a Band Pass Filter (BPF). The front end block 130 filters the transmit signal fed from the TRAS 120 in the service band and outputs the filtered transmit signal to an antenna. Also, the front end block 130 filters the receive signal fed from the antenna in the service band and outputs the filtered receive signal to the TRAS 120.

The TRAS 120 can include an isolator 122, a circulator 124, a pass and reflection block 126, and an RF switch 128.

The isolator 122, in the transmission mode, absorbs the reflected signal so that the reflected signal caused by the incorrect operation of the transmission path may not be totally reflected by the pass and reflection block 126 and transferred to the transmitter 110.

The circulator 124 sends the RF transmit and receive signals to a single direction.

The pass and reflection block 126 reflects the high-power RF transmit signal and passes the low-power RF receive signal.

The RF switch 128 isolates the transmission path and the receiver 140 in the transmission mode. For example, in the transmission mode, the RF switch 128 disconnects from the receiver 140. In the reception mode, the RF switch 128 connects the reception path with the receiver 140.

As discussed above, the isolator 122, which protects the transmitter 110 by absorbing the reflected signal in the incorrect transmission path, is equipped against the incorrect operation of the transmission path. Thus, when the transmission path correctly operates, the isolator 122 increases the loss of the transmission path.

When the loss of the transmission path increases, the transmitter 110 raises the power in order to sustain the same antenna power as in the absence of the isolator 122. In so doing, the power consumption and the heat of the transmitter 110 rises and thus system throughput deteriorates.

Therefore, a need exists for an apparatus and a method for transmitting and receiving high-power RF signals in a TDD wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for transmitting and receiving high-power Radio Frequency (RF) signals in a Time Division Duplexing (TDD) wireless communication system.

Another aspect of the present invention is to provide an apparatus and a method for protecting a Low Noise Amplifier (LNA) of a receiver from a high-power RF transmit signal in a TDD wireless communication system.

Yet another aspect of the present invention is to provide an apparatus and a method for reducing power consumption and heat of a transmitter in a TDD wireless communication system.

Still another aspect of the present invention is to provide an apparatus and a method for reducing loss of a transmission path by absorbing a reflected signal caused by incorrect operation of the transmission path in a TDD wireless communication system.

A further aspect of the present invention is to provide an apparatus and a method for reducing power consumption and heat of a transmitter due to an isolator in a transmission in a TDD wireless communication system.

In accordance with an aspect of the present invention, an apparatus for protecting receive circuits in a TDD wireless communication system is provided. The apparatus includes a TDD controller for controlling transmission and reception modes according to transmission and reception intervals, a transmitter for power-amplifying and outputting an RF signal in the transmission mode under control of the TDD controller, and a Transmit/Receive Antenna Switch (TRAS) for, in a transmission mode, forwarding a signal of the transmitter to an antenna feed line under the control of the TDD controller and for absorbing an output signal of the transmitter flowing to the receive circuits using a reflection structure positioned in a reception path, and, in a reception mode, for forwarding a signal fed from the antenna feed line to the receive circuits under the control of the TDD controller.

In accordance with another aspect of the present invention, a method for protecting receive circuits in a TDD wireless communication system is provided. The method includes determining operation status information of a TRAS which absorbs a transmit signal flowing into the receive circuits, in a transmission interval according to a TDD scheme, when the TRAS correctly operates in a transmission mode, controlling to send a transmit signal, and when the TRAS does not correctly operate in the transmission mode, controlling not to send the transmit signal. In the transmission mode, the TRAS forwards a signal of a transmitter to an antenna feed line under control of a TDD controller and absorbs an output signal of the transmitter flowing to the receive circuits using a reflection structure positioned in a reception path, and, in a reception mode, the TRAS forwards a signal fed from the antenna feed line to the receive circuits under the control of the TDD controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide Exemplary embodiments of the present invention provide a technique for preventing an isolator from increasing power consumption and heat of a transmitter in a Time Division Duplexing (TDD) wireless communication system.

Hereinafter, in the TDD wireless communication system, a transmission path indicates a path connecting a transmitter, a Transmit/Receive Antenna Switch (TRAS), and a front end block, and a reception path indicates a path connecting the front end block, the TRAS, and a receiver. The front end block and an antenna can be referred to as an antenna feed line path.

Figure 1:
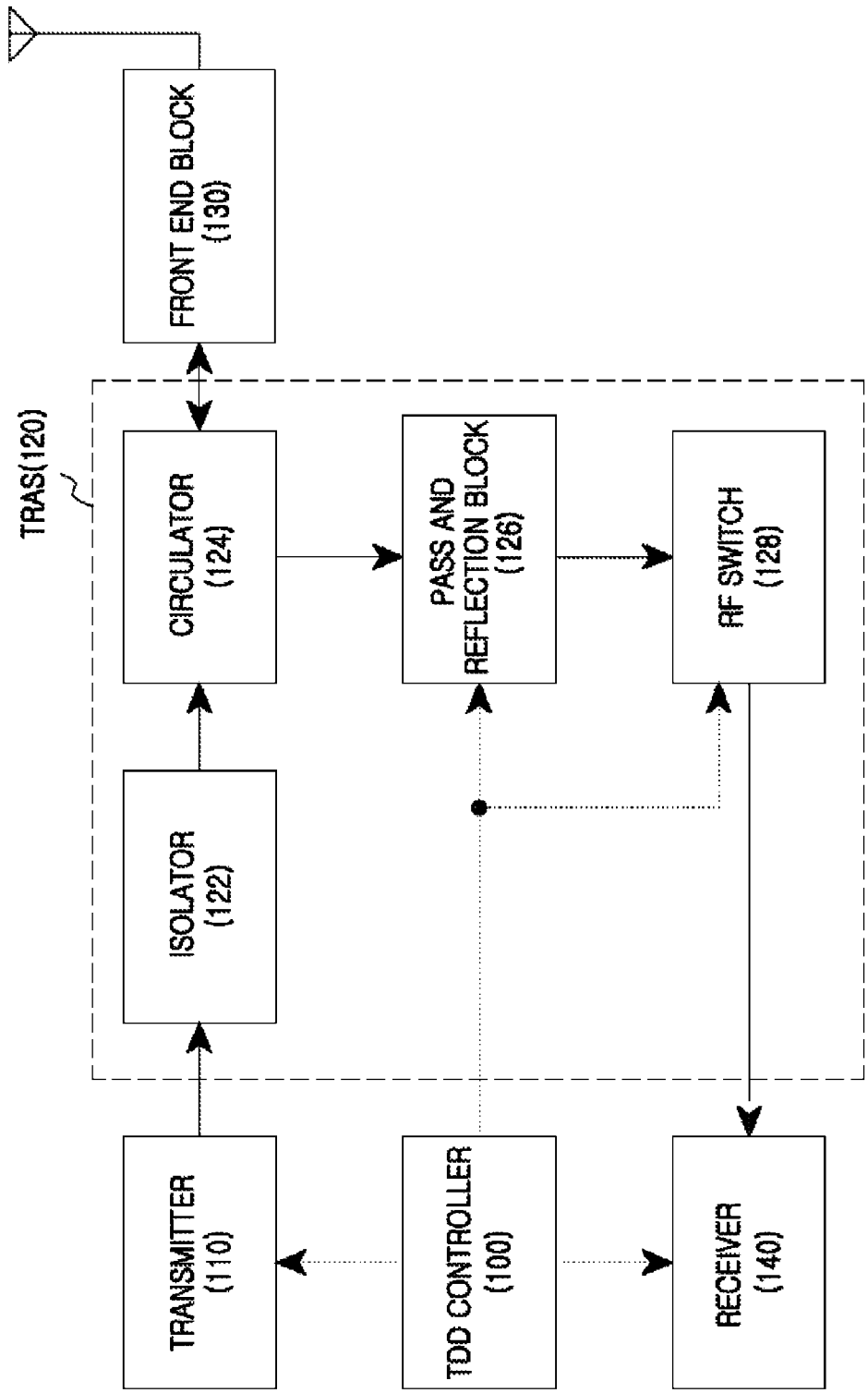
FIG. 1 illustrates a Radio Frequency (RF) transceiver apparatus in a Time Division Duplexing (TDD) wireless communication system according to the related art.
Figure 2:
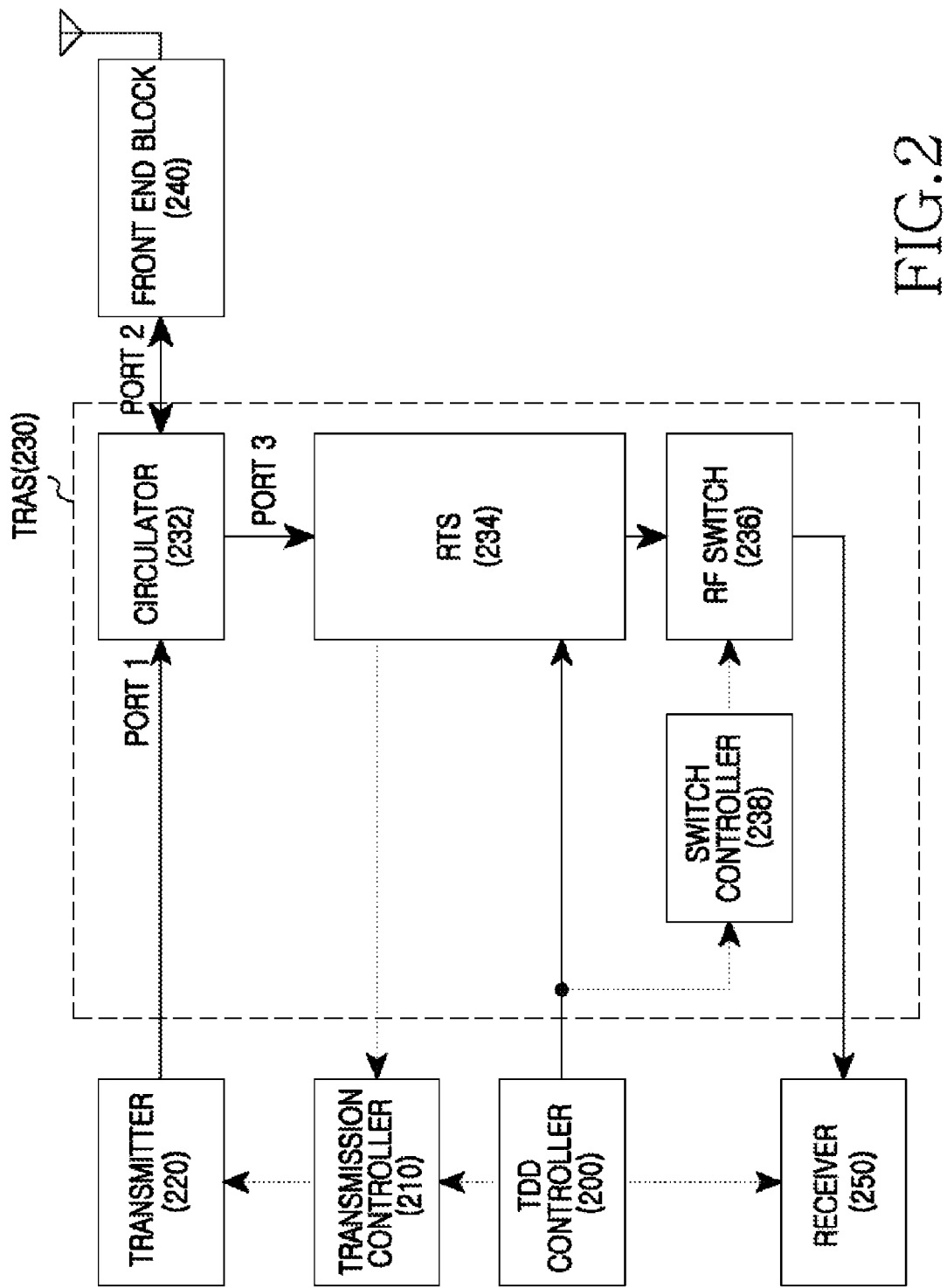
FIG. 2 illustrates an RF transceiver apparatus in a TDD wireless communication system according to an exemplary embodiment of the present invention.

FIG. 2 illustrates a Radio Frequency (RF) transceiver apparatus in a TDD wireless communication system according to an exemplary embodiment of the present invention.

Referring to FIG. 2, the RF transceiver apparatus includes a TDD controller 200, a transmission controller 210, a transmitter 220, a TRAS 230, a front end block 240, and a receiver 250.

The TDD controller 200 issues TDD control signals to control the blocks according to a transmission mode and a reception mode. For example, the TDD controller 200 issues a TDD Control signal for Transceiver (TDD) control signal in order to control the transmitter 220 to send a transmit signal in the transmission mode. The TDD controller 200 issues a TDD Control signal for TRAS (TCTR) control signal to control the TRAS 230 according to the transmission mode and the reception mode. The TDD controller 200 issues a TDD Control signal for Receiver (TCR) control signal to control the receiver 250 to receive a signal in the reception mode.

The transmission controller 210 controls the transmitter 220 by taking account of the TCT control signal fed from the TDD controller 200 and operation status information of the TRAS 230. For example, when the transmit TCT control signal is received from the TDD controller 200 and the TRAS 230 correctly operates in the transmission mode, the transmission controller 210 controls the transmitter 220 to send a high-power RF signal. When the transmit TCT control signal is not received from the TDD controller 200 and the TRAS 230 does not correctly operate in the transmission mode, the transmission controller 210 controls the transmitter 220 not to send a high-power RF signal.

Under the control of the transmission controller 210, the transmitter 220 outputs the high-power RF transmit signal. For instance, when the transmission controller 210 controls to send the high-power RF signal, the transmitter 220 converts a baseband modulated signal input from a modem (not shown) into an RF signal. Next, the transmitter 220 power-amplifies the RF signal using a power amplifier disposed at the back end, and outputs the amplified RF signal to the front end block 240 via the TRAS 230.

In the transmission mode, the TRAS 230 interconnects the transmitter 220 and the front end block 240 and isolates the transmission path from the receiver 250 under the control of the TDD controller 200. For example, when the transmission path incorrectly operates and a reflected signal takes place, the TRAS 230 protects the transmitter 220 and the receiver 250 from the high-power RF transmit signal by absorbing the reflected signal.

In the reception mode, the TRAS 230 interconnects the front end block 240 and the receiver 250 and isolates the reception path from the transmitter 220 under the control of the TDD controller 200.

In the reception mode, the receiver 250 low-noise amplifies a low-power RF receive signal fed from the front end block 240 via the TRAS 230 under the control of the TDD controller 200. Next, the receiver 250 converts the amplified receive signal into a baseband signal.

The front end block 240 includes a Band Pass Filter (BPF). The front end block 240 filters the transmit signal output from the TRAS 230 based on the service band, and outputs the filtered signal to an antenna. Also, the front end block 240 filters the receive signal output from the antenna based on the service band, and outputs the filtered signal to the TRAS 230.

The TRAS 230 includes a circulator 232, a Reflection structure TRAS using Hybrid Coupler (RTS) 234, an RF switch 236, and a switch controller 238.

The circulator 232 sends an RF transmit or receive signal to a single direction. For example, the circulator 232 sends the signal input through a first port to a second port, sends a signal input through the second port to a third port, and sends a signal input through the third port to the first port.

In the transmission mode, the RTS 234 absorbs the transmit signal output from the circulator 232 to block the transmit signal from entering the transmitter 220 and the receiver 250.

In the reception mode, the RTS 234 forwards the receive signal fed from the circulator 232 to the receiver 250 with substantially no loss.

The RF switch 236 isolates the transmission path and the receiver 250 in the transmission mode under the control of the switch controller 238. For example, in the transmission mode, the RF switch 236 disconnects from the receiver 250 under the control of the switch controller 238. In the reception mode, the RF switch 236 connects the reception path with the receiver 250 under the control of the switch controller 238.

The switch controller 238 controls the transmission and reception modes of the RF switch 236 according to the control signal issued from the TDD controller 200.

In the transmission, the magnitude of the high-power RF transmit signal transferred to the RTS 234 differs when the transmission path correctly operates and when the transmission path incorrectly operates. Accordingly, the RTS 234 employs a reflection structure using 90° hybrid couplers and Pass RF Receive signal and reflect RF Transmit signal blocks (PRTs) as shown in FIG. 3, and thus absorbs the transmit signal of a certain magnitude fed to the input stage.

Figure 3:
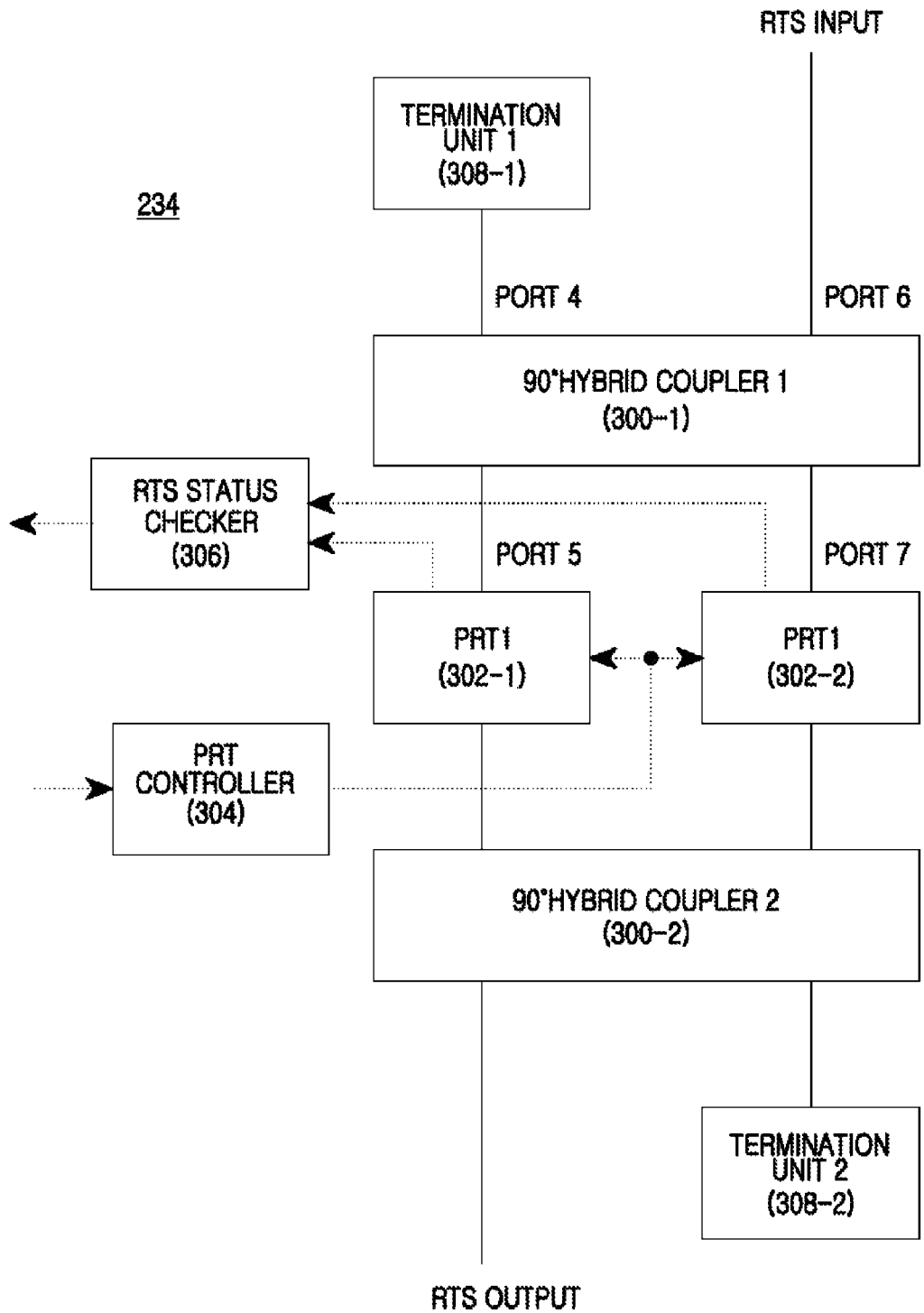
FIG. 3 illustrates a Reflection structure TRAS using Hybrid Coupler (RTS) according to an exemplary embodiment of the present invention.

FIG. 3 depicts a Pass RF Receive signal and reflect RF Transmit signal block (RTS) according to an exemplary embodiment of the present invention.

Referring to FIG. 3, the RTS 234 includes 90° hybrid couplers 300-1 and 300-2, PRTs 302-1 and 302-2, a PRT controller 304, an RTS status checker 306, and termination units 308-1 and 308-2.

The 90° hybrid couplers 300-1 and 300-2 split the input signal into two signals of the phase difference 90°. The magnitude of the split signal is half of the input signal, and the two split signals have the same magnitude.

When the two signals fed through the respective ports have the same magnitude and the phase difference of 90°, the 90° hybrid couplers 300-1 and 300-2 combine and output the two signals.

In the transmission mode, the PRTs 302-1 and 302-2 reflect the transmit signal at their input stage under the control of the PRT controller 304. In the reception mode, the PRTs 302-1 and 302-2 pass the receive signal with substantially no loss under the control of the PRT controller 304.

The PRT controller 304 controls the transmission and reception modes of the PRTs 302-1 and 302-2 under the control of the TDD controller 200.

The RTS status checker 306 determines an operation status of the RTS 234 by taking account of operation status information of the PRTs 302-1 and 302-2. For example, when both of the first PRT 302-1 and the second PRT 302-2 work in the transmission mode, the RTS status checker 306 determines that the RTS 234 operates in the transmission mode.

In the transmission mode, the first 90° hybrid coupler 300-1 splits the RTS input signal into two signals having a phase difference of 90° and outputs the split signals to the fourth port and the sixth port. The magnitude of the signals output to the fourth port and the sixth port is substantially identical to half of the magnitude of the RTS input signal.

The first PRT 302-1 reflects the signal input through the fourth port to the first 90° hybrid coupler 300-1 under the control of the PRT controller 304.

The second PRT 302-2 reflects the signal input through the sixth port to the first 90° hybrid coupler 300-1 under the control of the PRT controller 304.

When the magnitude of the signals reflected from the PRTs 302-1 and 302-2 is substantially identical and their phase difference is 90°, the first 90° hybrid coupler 300-1 forwards the two reflected signals to the first termination unit 308-1. In so doing, the first 90° hybrid coupler 300-1 does not send the reflected signals to the RTS input stage.

The first termination unit 308-1, which is a high-capacity 50Ω termination, absorbs the two signals fed from the first 90° hybrid coupler 300-1.

As the first PRT 302-1 and the second PRT 302-2 operate in the transmission mode, the RTS status checker 306 determines that the RTS 234 operates in the transmission mode.

In the reception mode, the first 90° hybrid coupler 300-1 splits the RTS input signal to two signals of the phase 90° and outputs the split signals to the fourth port and the sixth port. The magnitude of the signals output to the fourth port and the sixth port is substantially identical to the half of the magnitude of the RTS input signal.

The first PRT 302-1 outputs the signal input through the fourth port, to the fifth port without insertion loss under the control of the PRT controller 304.

The second PRT 302-2 outputs the signal input through the sixth port, to the seventh port without insertion loss under the control of the PRT controller 304.

When the magnitude of the two signals provided from the PRTs 302-1 and 302-2 is substantially identical and their phase difference is 90°, the second 90° hybrid coupler 300-2 combines and outputs the two signals to the RTS output stage. In so doing, the second 90° hybrid coupler 300-2 does not send the signals to the second termination unit 308-2.

As the first PRT 302-1 and the second PRT 302-2 operate in the reception mode, the RTS status checker 306 determines that the RTS 234 is not operating in the transmission mode.

In the transmission mode, the PRTs 302-1 and 302-2 reflect the input signal under the control of the PRT controller 304 as stated above. For doing so, each of the PRTs 302-1 and 302-2 is constituted as shown in FIG. 4.

Figure 4:
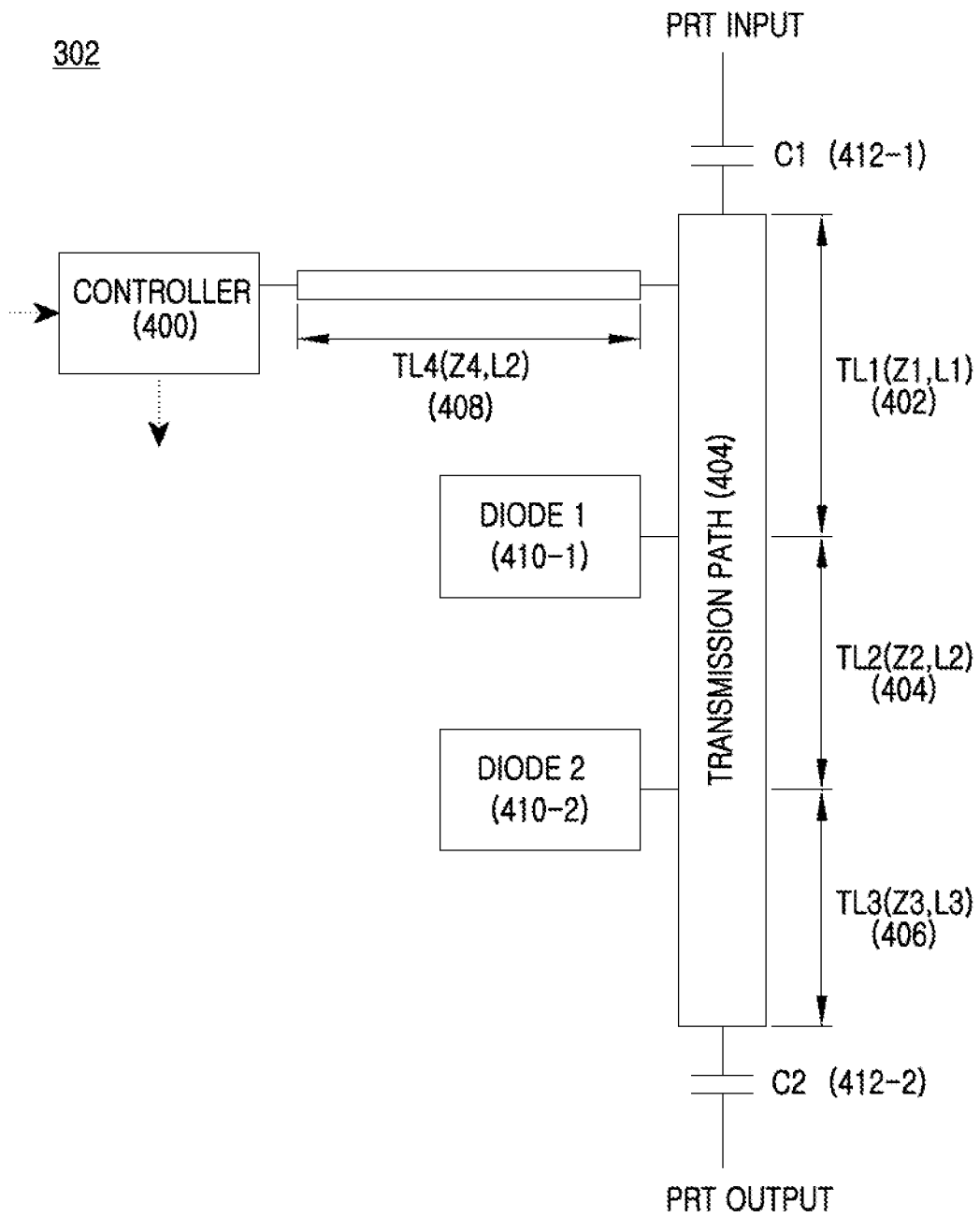
FIG. 4 illustrates a Pass RF Receive signal and reflect RF Transmit signal block (PRT) according to an exemplary embodiment of the present invention.

FIG. 4 depicts a Pass RF Receive signal and reflect RF Transmit signal block (PRT) according to an exemplary embodiment of the present invention.

Referring to FIG. 4, the PRTs 302-1 and 302-2 each include a controller 400, four types of Transmission Lines (TLs) including a TL1 402, a TL2 404, a TL3 406, and a TL4 408, PIN diodes 410-1 and 410-2, and DC blocking capacitors 412-1 and 412-2.

The controller 400 controls the PIN diodes 410-1 and 410-2 according to the transmission or reception mode of the PRTs 302-1 and 302-2 based on the control signal fed from the PRT controller 304.

The controller 400 determines operation status information of the PRT by detecting a transmission bias applied to the first PIN diode 410-1 and the second PIN diode 410-2. The controller 400 sends the operation status information of the PRTs 302-1 and 302-2 to the RTS status checker 306.

The DC blocking capacitors 412-1 and 412-2 block the bias applied to the first PIN diode 410-1 and the second PIN diode 410-2 from affecting the other modules.

In the transmission mode, the controller 400 generates the transmission bias which turns on the PIN diodes 410-1 and 410-2.

Next, the controller 400 applies the transmission bias to the PIN diodes 410-1 and 410-2 through the TL4 408 having the high characteristic impedance Z4 and the electrical length $\lambda/4$.

The PIN diodes 410-1 and 410-2 are turned on by the transmission bios applied through the TL4 408, and reflect the transmission signal applied from the first 90° hybrid coupler 300-1 to the PRT input stage, to the first 90° hybrid coupler 300-1. That is, the PIN diodes 410-1 and 410-2 isolate the PRT input stage and the PRT output stage by increasing attenuation of the transmit signal sent to the PRT output stage.

The TL2 404 has the characteristic impedance Z2 and the electrical length L2 to offset parasitic inductance components of the PIN diodes 410-1 and 410-2 turned on. The TL1 402 has the characteristic impedance Z1 and the electrical length L1 to optimize the reflection characteristic at the PRT input stage. The TL3 406 has the characteristic impedance Z3 and the electrical length L3 to minimize the attenuation characteristic in the PRT output stage.

In the reception mode, the controller 400 generates a reception bias to turn off the PIN diodes 410-1 and 410-2.

Next, the controller 400 applies the reception bias to the PIN diodes 410-1 and 410-2 through the TL4 408 having the high characteristic impedance Z4 and the electrical length $\lambda/4$.

The PIN diodes 410-1 and 410-2 are turned off by the reception bias applied through the TL4 408, and pass the transmission signal applied from the first 90° hybrid coupler 300-1 to the PRT input stage without attenuation.

At this time, the TL2 404 has the characteristic impedance Z2 and the electrical length L2 to offset the parasitic inductance components of the PIN diodes 410-1 and 410-2 that are turned off. The TL1 402 has the characteristic impedance Z1 and the electrical length L1 to optimize the reflection characteristic at the PRT input stage. The TL3 406 has the characteristic impedance Z3 and the electrical length L3 to minimize the attenuation characteristic in the PRT output stage.

Now, descriptions provide a method of the transmission controller 210 for controlling the transmitter 220 by taking into account the TCT control signal issued from the TDD controller 200 and the operation status information of the TRAS 230.

Figure 5:
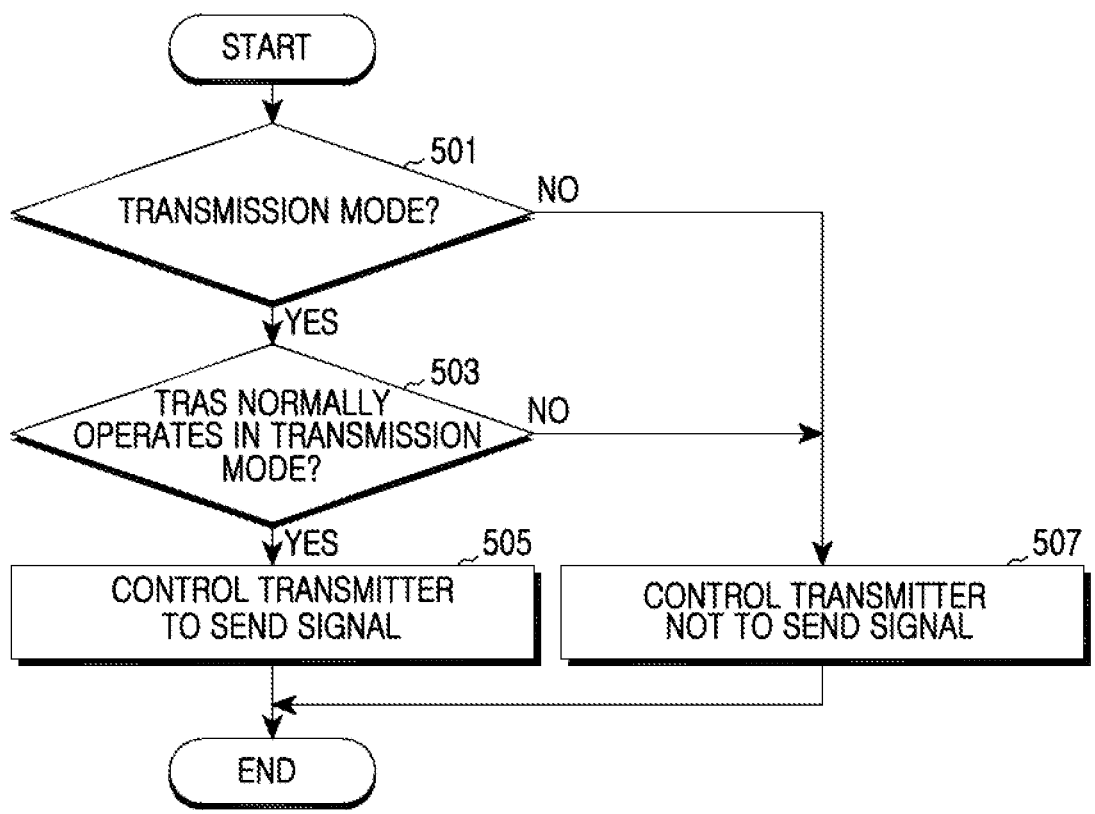
FIG. 5 illustrates a method for controlling a signal transmission of a transmitter in a TDD wireless communication system according to an exemplary embodiment of the present invention.

FIG. 5 illustrates a method for controlling a signal transmission of a transmitter in a TDD wireless communication system according to an exemplary embodiment of the present invention.

Referring to FIG. 5, the transmission controller 210 determines whether the current point is the transmission interval in step 501. For example, the transmission controller 210 examines whether the control signal most recently received from the TDD controller 200 is a transmission mode operation signal or a reception mode operation signal.

If it is determined in step 501 that the signal most recently received from the TDD controller 200 is the reception mode operation signal, the transmission controller 210 recognizes that the current point is the reception mode. Thus, the transmission controller 210 controls the transmitter 220 not to send the high-power RF transmit signal in step 507.

In contrast, if it is determined in step 501 that the signal most recently received from the TDD controller 200 is the transmission mode operation signal, the transmission controller 210 recognizes that the current point is the transmission mode. Hence, the transmission controller 210 determines whether the TRAS 230 correctly operates in the transmission mode in step 503. For example, based on the operation status information provided from the TRAS 230, the transmission controller 210 determines whether the TRAS 230 correctly operates in the transmission mode. The correct operation status of the TRAS 230 in the transmission mode implies that both of the first PRT 302-1 and the second PRT 302-2 of the RTS 234 constituting the TRAS 230 work in the transmission mode.

If it is determined in step 503 that the TRAS 230 does not correctly operate in the transmission mode, the transmission controller 210 controls the transmitter 220 not to send the transmit signal so as to protect the receiver 250 against the high-power RF transmit signal in step 507.

In contrast, if it is determined in step 503 that the TRAS 230 correctly operates in the transmission mode, the transmission controller 210 controls the transmitter 220 to send the high-power RF signal in step 505.

Next, the transmission controller 210 finishes this process.

In accordance with an exemplary embodiment of the present invention, after confirming the transmission interval according to the TDD scheme, the transmission controller 210 determines the operation status of the TRAS 230.

Alternatively, the transmission controller 210 may first determine the operation status of the TRAS 230 and then determine the transmission interval according to the TDD scheme.

As set forth above, in the TDD wireless communication system, by removing the reflected signal caused by the incorrect operation of the transmission path without using the isolator in the transmission path, it is possible to reduce the loss of the transmission path due to the reflected signal and to reduce the power consumption and the heat of the transmitter.

By controlling to send the high-power RF transmit signal only when the TRAS correctly operates in the transmission mode, the stability of the system can be enhanced by protecting the LNA of the receiver when the system is installed initially or when an additional module is installed to extend the frequency band.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for protecting receive circuits in a Time Division Duplexing (TDD) wireless communication system, the apparatus comprising:
   a TDD controller for controlling transmission and reception modes according to transmission and reception intervals;
   a transmitter for power-amplifying and outputting a Radio Frequency (RF) signal in the transmission mode under control of the TDD controller; and
   a Transmit/Receive Antenna Switch (TRAS) for, in the transmission mode, forwarding a signal of the transmitter to an antenna feed line under the control of the TDD controller and for absorbing an output signal of the transmitter flowing to the receive circuits using a pass and reflection block positioned in a reception path, and, in the reception mode, for forwarding a signal fed from the antenna feed line to the receive circuits under the control of the TDD controller,
   wherein the pass and reflection block comprises:
      a first 90° hybrid coupler for splitting an input signal fed from the TRAS into two signals being half of the input signal and having a phase difference 90°, and for outputting the two signals to different ports;
      a first reflection block for, in the transmission mode, reflecting the signal output from the first 90° hybrid coupler through a first port, to the first port, and, in the reception mode, for passing the signal output from the first 90° hybrid coupler through the first port;
      a second reflection block for, in the transmission mode, reflecting the signal output from the first 90° hybrid coupler through a second port, to the second port, and, in the reception mode, for passing the signal output from the first 90° hybrid coupler through the second port;
      a second 90° hybrid coupler for combining the two signals output from the first reflection block and the second reflection block and for sending the combined signal to the receive circuits; and
      a termination unit for absorbing the reflected signals fed from the first 90° hybrid coupler.

2. The apparatus of claim 1, wherein the TRAS comprises:
   a circulator for forwarding the signal of the transmitter to the antenna feed line, and for forwarding the signal fed from the antenna feed line to the receive circuits,
   wherein the pass and reflection block, in the transmission mode, absorbs a signal fed from the circulator, and, in the reception mode, sends the signal fed from the circulator to the receive circuits.

3. The apparatus of claim 1, wherein, in the pass and reflection block in the transmission mode, the first 90° hybrid coupler splits the input signal fed from the circulator into two signals being half of the magnitude of the input signal and having a phase difference of 90°, and outputs the two signals to the different ports,
   the first reflection block reflects the signal output from the first 90° hybrid coupler through the first port, to the first port,
   the second reflection block reflects the signal output from the first 90° hybrid coupler through the second port, to the second port,
   the second 90° hybrid coupler combines the signals reflected by the first reflection block and the second reflection block and sends the combined signal to the termination unit, and
   the termination unit absorbs the signal provided from the first 90° hybrid coupler.

4. The apparatus of claim 1, wherein, in the pass and reflection block in the reception mode, the first 90° hybrid coupler splits the input signal fed from the circulator into two signals being half of the magnitude of the input signal and having a phase difference of 90°, and outputs the two signals to the different ports,
   the first reflection block passes the signal output from the 90° hybrid coupler through the first port,
   the second reflection block passes the signal output from the 90° hybrid coupler through the second port, and
   the second 90° hybrid coupler combines the two signals received from the first reflection block and the second reflection block and sends the combined signal to the receive circuits.

5. The apparatus of claim 1, wherein the pass and reflection block further comprises:
   a status checker for determining operation status information of the pass and reflection block by taking into account operation status information of the first reflection block and the second reflection block.

6. The apparatus of claim 1, wherein the pass and reflection block further comprises:
   a reflection block controller for controlling the transmission and reception modes of the first reflection block and the second reflection block under the control of the TDD controller,
   wherein, in the transmission mode, the first reflection block and the second reflection block reflect the signal input through the respective ports under the control of the reflection block controller, and, in the reception mode, the first reflection block and the second reflection block pass the signal input through the respective ports under the control of the reflection block controller.

7. The apparatus of claim 1, wherein the first reflection block and the second reflection block comprise:
   a transmission path for interconnecting the first 90° hybrid coupler and the second 90° hybrid coupler;
   a controller for generating a bias to turn on diodes in the transmission mode, and for generating a bias to turn off the diodes in the reception mode; and
   two or more PIN diodes, which are disposed in certain locations of the transmission path, for, in the transmission mode, being turned on by the bias of the controller and for reflecting the signal output from the first 90° hybrid coupler, and, in the reception mode, for being turned off by the bias of the controller and for passing the signal provided from the first 90° hybrid coupler.

8. The apparatus of claim 1, further comprising:
   a transmission controller for controlling the transmitter by taking into account a control signal provided from the TDD controller and the operation status information of the TRAS,
   wherein, when the transmission controller controls to send a signal, the transmitter power-amplifies and outputs an RF signal.

9. The apparatus of claim 2, wherein the TRAS further comprises:

a switch disposed between the pass and reflection block and the receive circuits for, in the transmission mode, disconnecting the pass and reflection block from the receive circuits, and, in the reception mode, for interconnecting the pass and reflection block and the receive circuits.

10. The apparatus of claim 5, wherein, when the first reflection block and the second reflection block reflect the signal output from the first 90° hybrid coupler, the status checker determines that the pass and reflection block operates in the transmission mode.

11. The apparatus of claim 7, wherein, in the first reflection block and the second reflection block in the transmission mode, the controller generates the bias to turn on the diodes, and the two or more PIN diodes are turned on by the bias of the controller at the certain locations of the transmission path, and reflect the signal provided from the first 90° hybrid coupler.

12. The apparatus of claim 7, wherein, in the first reflection block and the second reflection block in the reception mode, the controller generates the bias to turn off the diodes, and the two or more PIN diodes are turned off by the bias of the controller at the certain locations of the transmission path, and pass the signal provided from the first 90° hybrid coupler.

13. The apparatus of claim 8, wherein, when the TDD controller controls the transmitter to operate in the transmission mode and the TRAS correctly operates in the transmission mode, the transmission controller controls the transmitter to send a signal.

14. A method for protecting receive circuits in a Time Division Duplexing (TDD) wireless communication system, the method comprising:

determining operation status information of a Transmit/Receive Antenna Switch (TRAS) which absorbs a transmit signal flowing into the receive circuits, in a transmission interval according to a TDD scheme;

when the TRAS correctly operates in the transmission mode, controlling to send a transmit signal; and when the TRAS does not correctly operate in a transmission mode, controlling not to send the transmit signal, wherein, in the transmission mode, the TRAS forwards a signal of a transmitter to an antenna feed line under control of a TDD controller and absorbs an output signal of the transmitter flowing to the receive circuits using a pass and reflection block positioned in a reception path, and, in the reception mode, the TRAS forwards a signal fed from the antenna feed line to the receive circuits under the control of the TDD controller, wherein the pass and reflection block is configured to:

split, by a first 90° hybrid coupler included in the pass and reflection block, an input signal fed from the TRAS into two signals being half of the magnitude of the input signal and having a phase difference of 90°;

output, by the first 90° hybrid coupler, the two signals to different ports;

reflect, in the transmission mode, by a first reflection block included in the pass and reflection block, the signal output from the first 90° hybrid coupler through a first port, to the first port;

pass, in the reception mode, by the first reflection block, the signal output from the first 90° hybrid coupler through the first port;

reflect, in the transmission mode, by a second reflection block included in the pass and reflection block, the signal output from the first 90° hybrid coupler through a second port, to the second port;

pass, in the reception mode, by the second reflection block, the signal output from the first 90° hybrid coupler through the second port;

combine, by a second 90° hybrid coupler included in the pass and reflection block, the two signals provided from the first reflection block and the second reflection block;

send, by the second 90° hybrid coupler, the combined signal to the receive circuits; and absorb, by a termination unit, the reflected signals fed from the first 90° hybrid coupler.

15. The method of claim 14, further comprising:

in a reception interval according to the TDD scheme, controlling not to send the transmit signal.

16. The method of claim 14, further comprising:

forwarding, by a circulator included in the TRAS, the signal of the transmitter to the antenna feed line;

forwarding, by the circulator, the signal fed from the antenna feed line to the receive circuits;

wherein the pass and reflection block, in the transmission mode, absorbs a signal fed from the circulator; and in the reception mode, sending, by the pass and reflection block, the signal fed from the circulator to the receive circuits.

17. The method of claim 14, further comprising:

determining, by a status checker included in the pass and reflection block, operation status information of the pass and reflection block by taking into account operation status information of the first reflection block and the second reflection block.

18. The method of claim 14, further comprising:

controlling, by a transmission controller, the transmitter by taking into account a control signal provided from the TDD controller and the operation status information of the TRAS, wherein, when the transmission controller controls to send a signal, the transmitter power-amplifies and outputs an RF signal.

19. The method of claim 16, further comprising:

in the transmission mode, disconnecting, by a switch included in the TRAS and disposed between the pass and reflection block and the receive circuits, the pass and reflection block from the receive circuits; and in the reception mode, interconnecting, by the switch, the pass and reflection block and the receive circuits.

20. The method of claim 18, wherein, when the TDD controller controls the transmitter to operate in the transmission mode and the TRAS correctly operates in the transmission mode, the transmission controller controls the transmitter to send a signal.

* * * * *